US012401933B2

(12) United States Patent
Miller et al.

(10) Patent No.: US 12,401,933 B2
(45) Date of Patent: Aug. 26, 2025

(54) METALLIC PRODUCTS WITH A MULTI-COLOR CLOTH-LIKE APPEARANCE AND METHOD OF MANUFACTURING

(71) Applicant: OAKWOOD METAL FABRICATING CO., Dearborn, MI (US)

(72) Inventors: William Todd Miller, Allen Park, MI (US); Michael Allen Johnson, Farmington Hills, MI (US); Robert Arthur Sonnenberg, Novi, MI (US); Joel Matthew Cormier, Lathrup Village, MI (US); Richard Francois Audi, Dearborn, MI (US); Donald Scott Smith, Commerce, MI (US)

(73) Assignee: OAKWOOD METAL FABRICATING CO., Dearborn, MI (US)

( * ) Notice: Subject to any disclaimer, the term of this patent is extended or adjusted under 35 U.S.C. 154(b) by 100 days.

(21) Appl. No.: 18/123,176

(22) Filed: Mar. 17, 2023

(65) Prior Publication Data

US 2023/0232140 A1 Jul. 20, 2023

Related U.S. Application Data

(63) Continuation-in-part of application No. 17/459,390, filed on Aug. 27, 2021, now Pat. No. 11,611,818.

(51) Int. Cl.
*H04R 1/02* (2006.01)

(52) U.S. Cl.
CPC .................................... *H04R 1/023* (2013.01)

(58) Field of Classification Search
CPC .......................... H04R 2201/029; H04R 1/023
See application file for complete search history.

(56) References Cited

U.S. PATENT DOCUMENTS

| | | | | |
|---|---|---|---|---|
| 6,279,678 | B1 | 8/2001 | Tracy | |
| 10,135,130 | B1 * | 11/2018 | Bouchard | H01Q 1/1228 |
| 2020/0384734 | A1 | 12/2020 | Akisada et al. | |
| 2021/0085047 | A1 * | 3/2021 | Wright | A45C 13/02 |
| 2021/0235174 | A1 * | 7/2021 | Audi | H04R 1/323 |

FOREIGN PATENT DOCUMENTS

KR 20130090564 A * 8/2013

OTHER PUBLICATIONS

German Patent and Trademark Office, German Office Action for German Patent Application No. 10 2021 132 483.1 dated Nov. 18, 2024.

* cited by examiner

*Primary Examiner* — Sunita Joshi
(74) *Attorney, Agent, or Firm* — Brooks Kushman P.C.

(57) ABSTRACT

A metallic product such as an audio speaker cover and a related method of manufacturing that has a surface with a cloth-like appearance, yet allows the passage of sound. The metallic audio speaker cover has a base of expanded metal with polygonal openings or woven wire through which the sound may pass, the openings being defined by filaments that provide structural strength; a pretreatment film that adheres to the expanded metal base, and one or more multi-color powder coating films that adhere to the pretreatment film. In some embodiments, the film also has anti-microbial properties.

21 Claims, 8 Drawing Sheets

PLAIN DUTCH WEAVE

TWILL DUTCH

PLAIN WEAVE

METALLIC PRODUCTS WITH A MULTI-COLOR CLOTH-LIKE APPEARANCE AND METHOD OF MANUFACTURING

CROSS-REFERENCE TO RELATED APPLICATION

This application is a continuation-in-part of U.S. Ser. No. 17/459390 filed Aug. 27, 2021, now U.S. Pat. No. 11,611, 818 issued Mar. 21, 2023, which is incorporated herein by reference.

TECHNICAL FIELD

Several aspects of this disclosure relate to products such as metallic audio speaker covers with a multi-color, cloth-like appearance and related manufacturing methods.

BACKGROUND ART

Generally, products such as audio speaker covers must be compatible with their use environment, such as an automotive interior design theme. The materials of which such covers are made are near each other. The interior design theme includes leather, fabrics, hard and soft plastic trim, plastic trim covered in fabric, and various metal components with which the audio speaker cover must be in visual harmony.

Traditionally, the finishes on the metal audio covers have been selected to present a notable contrast in finish and texture with the remainder of the cabin. Historically, the OEM would choose a single material/color/tone/finish for the audio cover so that the audio cover contrasted with the rest of the interior. This theme was typically deployed to highlight branded premium audio packages and systems.

Recently, with the transition to electric propulsion for the automotive industry, there has been an initiative to reduce weight and streamline interior componentry. This paradigm shift requires that metal audio covers mimic the gloss, texture, and color of the adjacent fabric or other material patterns to create a harmonious styling theme.

Metallic audio speaker covers have been historically produced from a variety of metals. These include alloys of low-carbon steel, aluminum, stainless steel, and other cost-effective metals with a high strength-to-weight ratio. Based on the unique physical characteristics of each metal and alloy, the base material thickness of the audio cover is typically selected such that there is adequate strength after the open area has been created for sound transmission to withstand wear and tear during manufacturing and after the intermediate product has been converted into a finished audio cover.

Various methods are available to generate open areas in the speaker grille for sound transmission. These include punch perforating, laser perforating, water jet cutting, drilling, photochemical etching, and metal expanding. Each method for generating the open area creates a unique metallic surface ("texture"), ranging from relatively smooth to coarse/undulating surfaces.

Depending upon which method is chosen, creating an open area for sound transmission can be accomplished in an individual metal blank or while the metal is still in coil form. Creating the open area in coils typically offers superior economics and throughput. Once the open area has been generated, coils or blanks of material are converted into formed metallic covers using traditional metal forming processes, including blanking, punching, forming, cam-forming, and the like.

Optionally, a pretreatment step may cleanse the cover before subsequent coatings or to prevent oxidation of the metal before final finishing. These pre-treatments can range from merely surface cleaning to chemically etching, where metal is removed, to applying a physical layer including primers, zinc phosphate, iron phosphate, galvanizing, e-coatings, and the like.

Finishing techniques for metallic audio covers have traditionally involved single-color or tinted coatings. Finishing techniques for single-color coatings include thermosetting powder coatings, solvent-based lacquers, and enamels, water-based paints, color anodizing layers, material PVD (physical vapor deposition), tinted clear coats, and the like.

Wet spray painting involves solvent-based paint systems. These include lacquer and enamel. They have been historically applied via a spray gun to various metal components, including audio covers. These coatings may be transparent, opaque, or solid in color. Other solid elements can be added to these coatings to add depth of color, including pearl, metallic, and other solid particles. Due to environmental concerns, this type of coating is only used when a perfectly smooth surface is required. The wet spray process cannot provide a multi-color surface that simulates a cloth-like appearance on metallic audio covers.

Metal anodizing imparts a tinted coating to a metal surface. Metallic parts are dipped into a single color chemistry that creates an anodic coating layer on the part surface. Like wet spray painting approaches, conventional anodizing processes cannot produce a multi-color surface that simulates a cloth-like appearance on metallic audio covers.

Traditional PVD techniques involve a single solid color/tone material vaporized in a vacuum and deposited on the surface of a metallic audio cover within a chamber. Like the other techniques referenced above, the PVD process cannot provide a multi-color surface that simulates a cloth-like appearance on metallic audio covers.

Conventional powder-coated audio covers typically produce a single monolithic color. Such techniques cannot provide a multi-color surface that simulates a cloth-like appearance on metallic audio covers.

The prior art discussed above represents conventional methods for generating single color/tone appearances on the metal speaker covers. These traditional finishes are deficient in their ability to simulate the color and texture of multi-color fabrics. Specifically, the surface appearance of automobile speaker grilles made by conventional techniques needs one or more steps to simulate the appearance of multi-color fabrics. What is desired is an audio speaker grille that resembles a cloth or fabric in terms of color, gloss, surface topography, and other performance requirements.

Prior art processes only produce a single-color coating that does not mimic a cloth-like appearance. What the industry desires is a metal audio cover that has superior acoustics and durability that metal audio covers provide, while at the same time having the look of a cloth or fabric and optionally having anti-microbial properties.

Manufacturing such products may involve expanded metal lattices as a substrate. But metal expansion is challenging. Traditional diamond-shaped expanded metal patterns have historically been produced with moderate difficulty. These patterns' manufacturing and conversion limits as a function of material type and tooling are known. It would be desirable to develop expansion tooling that produces patterns that mimic specific woven fabric patterns when combined with multi-colored paint. Such challenges represent an exponential increase in difficulty and complexity.

Conventional metal expansion tooling may use an expanding process that both shears and stretches metal to create multiple open areas for sound transmission. As the open area increases, material strength first increases with strain hardening and then decreases with the necking of the individual strands until tensile failure or embrittlement occurs.

Expansion tooling and patterns must be selected such that the tooling combined with the expansion process produces a material of adequate residual strength and consistent visual aesthetic throughout the expanded roll stock that can be reproduced from one raw material lot to another. Maintaining adequate strength in the metal "tethers" that connect the expanded rows is essential to form and function. The product of the tooling and expansion process must be such that the resulting expanded material can withstand the rigors of three-dimensional forming and durability of the finished product, such as an audio cover or air vent with an adequate open area to facilitate sound transmission or fluid passage with minimal loss.

Commonly owned U.S. Pat. No. 11,611,818 describes a metallic audio cover with a multi-color cloth-like appearance and method of manufacturing such articles. That patent describes and depicts traditional symmetrical diamond shaped expanded metal patterns. For reasons discussed below, it would be desirable to have non-traditional (atypical and asymmetrical) expanded metal patterns intentionally engineered to mimic specific woven fabrics when combined with multi-color and low gloss paint with adequate open area for air/sound transmission.

Further, it would be useful to extend the products and processes disclosed in the parent application beyond audio covers to any decorative application of expanded metal that requires open areas for fluid, gas, or sound permeability/transmission without compromising strength or appearance.

SUMMARY

Several aspects of this disclosure relate to products and methods for manufacturing objects such as metal audio components or speaker covers with a multi-color, cloth-like appearance. Specifically, the techniques disclosed balance the primary elements necessary to simulate the appearance of multi-color fabrics within a metallic audio cover.

Various process steps include combinations of multi-color coatings, low gloss, and metallic patterns with adequate surface area and surface topography to match those of a target fabric. Suitable combinations achieve the goal of a metallic audio cover, for example, that offers superior acoustic properties and the durability that metal audio covers provide with a surface that looks like a fabric.

Of related importance is the ability, if desired, to provide an anti-microbial finish to these metal audio covers in the painting process. Along with the inherent disadvantages of cloth speaker covers, including staining and tearing, anti-microbial properties assume significance in current and future health concerns.

In a preferred set of process steps, one first selects a traditional or non-traditional expanded metal pattern and attempts to match the surface texture of a target fabric. In addition to the pattern of the metal itself, one must also consider the film build of both the pretreatment (if applicable) and the film build of the multi-color coating. The combination of pattern and layered film build desirably mimics the target fabric. Additionally, the final finish coating preferably exhibits a gloss level that closely matches that of the target fabric.

This disclosure includes a means for configuring, and the resulting products produced using non-traditional (atypical and asymmetrical) expanded metal patterns intentionally engineered to mimic specific woven fabrics when combined with multi-color and low gloss paint with adequate open area for air/sound transmission.

Designers often prefer the superior durability and acoustic properties of expanded metal. At the same time, they may sacrifice acoustic performance by selecting less durable fabrics that offer a visual aesthetic tradition that metal audio covers have been unable to acceptably imitate or mimic up until this point. These patterns include for example symmetrical weaves, plain Dutch weaves, twill Dutch weaves, plain weaves, herringbone, fishbone, and chevron aesthetics.

The above advantages and other advantages and features of the present disclosure will be readily apparent from the following detailed description of the preferred embodiments and process steps in connection with the accompanying drawings.

DETAILED DESCRIPTION

As those of ordinary skill will understand, various features of the present disclosure as illustrated and described with reference to any of the Figures may be combined with features illustrated in one or more other Figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations.

Figure 1:
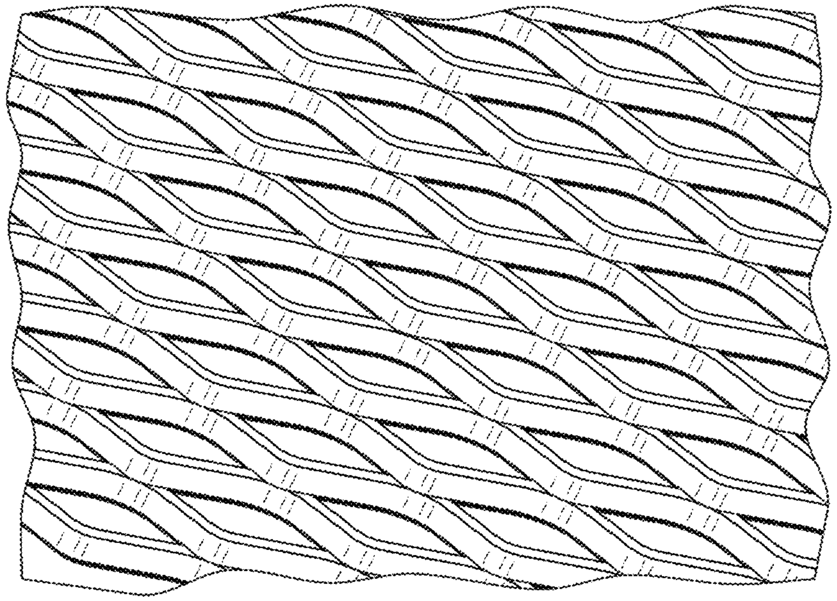
FIG. 1 is a perspective view of a representative specimen of expanded metal with diamond-shaped unit openings before being subjected to subsequent processing steps.

In a preferred series of process steps, one process begins with selecting an expanded metal pattern. FIG. 1 is an image of traditional raw expanded metal before exposure to subsequent handling. It has a unit dimension that can be considered to be diamond-shaped. As discussed later, such unit configurations are not limited to a diamond shape.

During metal expansion, an expanding tool imparts a pattern into a continuous coil of a malleable alloy of, for example, low-carbon steel or aluminum using a bypass shearing process. In some applications, materials other than a metallic material may be deployed, such as metal-composites or a plastic impregnated with metallic particles or ceramics impregnated with metallic particles.

Some pattern design elements to be selected include a type or gauge of expanding tool, material thickness, material type, and expanded metal machine process variables/settings. Characterizing parameters are shown for a diamond-shaped unit dimension in FIG. 2. It will be appreciated that other unit shapes may be used. They include a polygonal unit, an oval unit, an elliptical unit, and other units with a continuous periphery.

Figure 2:
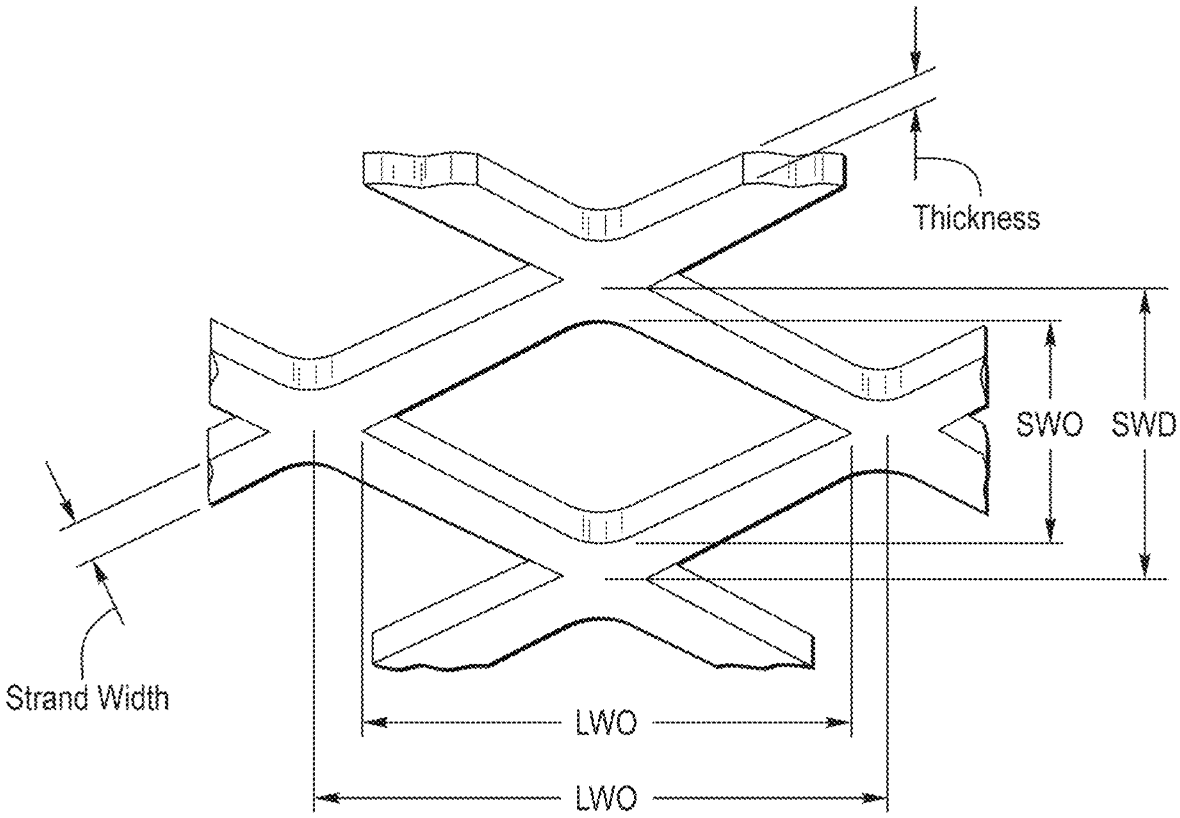
FIG. 2 is an expanded view of a diamond-shaped unit of expanded metal that depicts some of its identifying characteristics.

Traditional expanded metal patterns are created using a contoured shearing blade with a sawtooth pattern having a flattened "saw tip". The period between teeth and the shape of each tooth are some factors that influence a pattern that matches the surface topography of a target fabric. Changing these factors influences the expanded pattern imparted into the metal. In the case of a diamond-shaped unit dimension, referring to FIG. 2, representative elements of a 2D/3D surface that matches that of the target fabric include the SWD (short way of the diamond) and LWD (long way of the diamond), as well as SWO (short way of opening) and LWO (long way of opening), ST (strand thickness) and SW (strand width).

One goal of the disclosed process is to produce a cloth-like metallic object or product such as an audio speaker with the appearance of a fabric, i.e., the visually perceived property of a fabric that strikes the observer's eye. That property is related to the surface of the fabric. The fabric appearance is directly associated with the fabric construction, weave, degree of twist, the material used, and reflectance properties of the material. www.textileadvisor.com/2019/02/fabric-appearance-fabric-properties-of.html.

Automotive interior materials of interest are generally multi-colored, woven fabrics with a relatively low gloss. There are many woven patterns. Generally, these patterns are relatively fine, so the substrate they overlie is not visible. Illustrative examples are depicted at www.midwestfabrics-.com/fabric/automotive-upholstery-fabric.html, which is incorporated by reference. That source suggests that such factors can characterize automotive upholstery as category (e.g., OEM Detroit Number), color (white, grey, black, red, beige, brown, blue, green, tan, purple, and silver), fabric content (polyester, vinyl, fabric, nylon/polyester, and tweed), vehicle make, vehicle year and price. The source defines 218 items of automotive upholstery fabric.

FIG. 3 is a process flow diagram that details representative steps for configuring an audio cover with a cloth-like appearance.

Powder coat chemistry, powder color pallet, powder particle size, and the additives used to control gloss are factors that influence a cloth-like appearance. In one preferred embodiment, a specific polyester (TGIC—tri glycidyl isocyanurate—a chemical compound formulated in some powder coatings as a curing agent) or polyester urethane chemistries are utilized. Such chemistries have demonstrated their ability to meet automotive performance specifications for interior trim.

Figure 4:
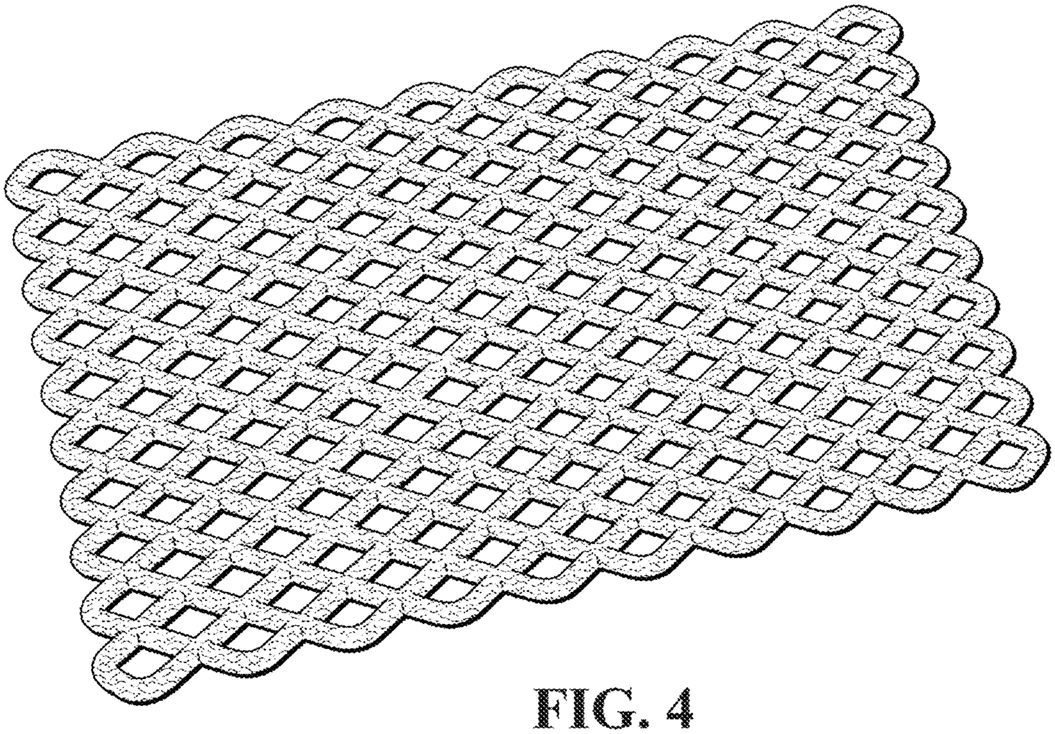
FIG. 4 is a quartering perspective enlarged top view of an area of a cloth-like multi-color expanded metal audio speaker cover.
Figure 5:
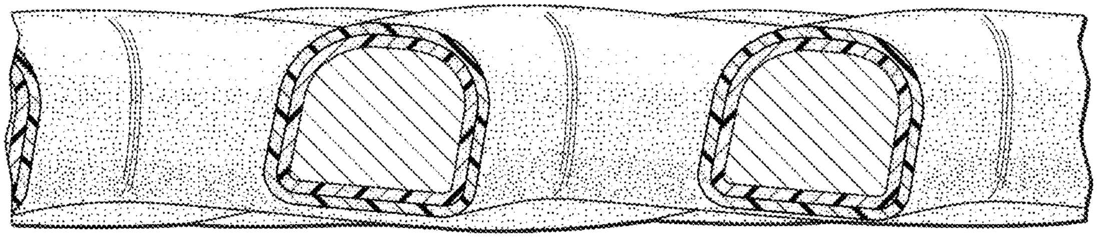
FIG. 5 is an enlarged sectional view through a specimen of expanded metal that is encapsulated by a primer film and a multi-color paint.

FIGS. 4 and 5 depict representative quartering isometric and cross-sectional views of a finished audio speaker grille. The grille has a substrate that is expanded metal. On the upper surface of the expanded metal and at least partially permeating therethrough is a pretreatment film that supports a multi-color powder coating film. During the electrostatic powder coat painting process, the pre-treatment film layer encapsulates virtually all of the raw expanded metal surface area. This pretreatment film layer is then preferably entirely encapsulated by the multi-color powder coating film with a clothlike appearance as described.

The interior Class A surface is of prime interest as it lies adjacent to the target fabric it seeks to mimic. Following the disclosed process steps, an exterior surface of the top side of the target fabric is mimicked by a nearby surface of the audio speaker grille. Sound passes through the open spaces formed through the expanded metal grille. The sectional view in FIG. 5 through the expanded metal pattern depicts the layering described herein.

Figure 6:
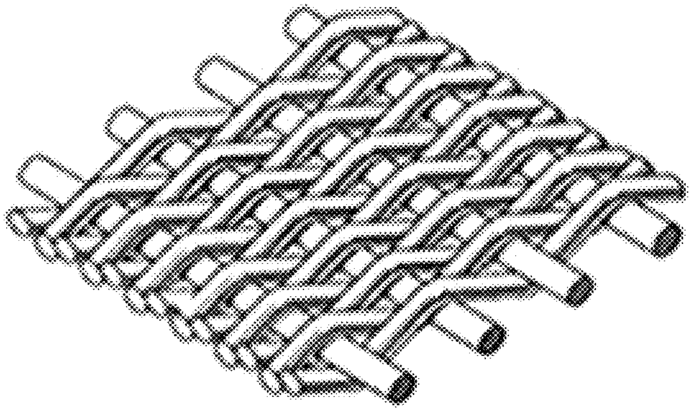
FIG. 6 illustrates a plain Dutch weave.
Figure 7:
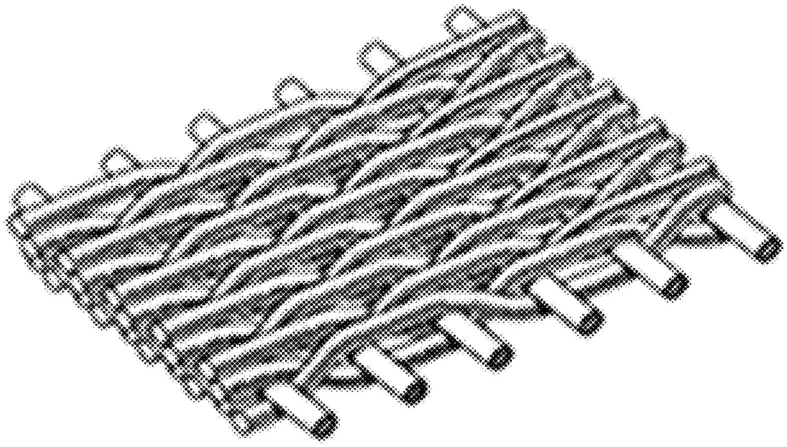
FIG. 7 illustrates a twill Dutch weave.
Figure 8:
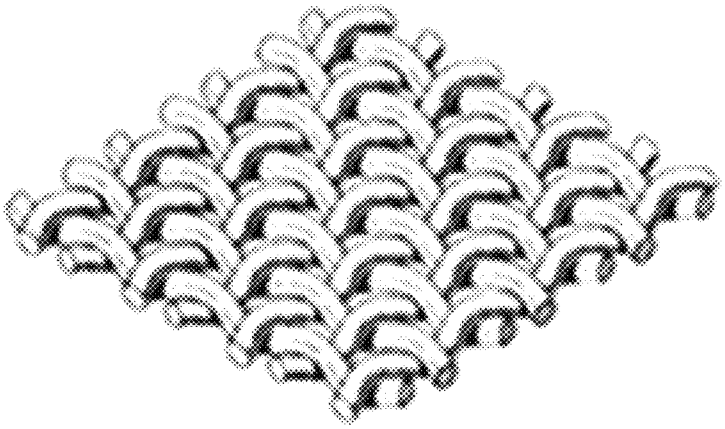
FIG. 8 illustrates a plain weave.

FIGS. 6-8 depict three fabric weave configurations commonly selected for use in automotive interiors. The impersonation of such configurations necessitates the development of non-traditional (atypical and asymmetrical) expanded metal patterns intentionally engineered to mimic specific woven fabrics when combined with multi-color and low gloss paint with adequate open area for air/sound transmission.

Designers often prefer the superior durability and acoustic properties of expanded metal. At the same time, they may sacrifice acoustic performance by selecting less durable fabrics that offer a visual aesthetic tradition that metal audio covers have been unable to acceptable imitate or mimic up until this point. These patterns include symmetrical weaves (FIG. 4), plain Dutch weaves (FIG. 6), twill Dutch weaves FIG. 7), plain weaves (FIG. 8), herringbone, fishbone and chevron aesthetics.

One purpose of simulating various fabrics with atypical or asymmetrical expanded metal patterns is to mimic specific fabric weaves. FIGS. 6-8 depict expanded metal patterns designed for that purpose.

Figure 9:
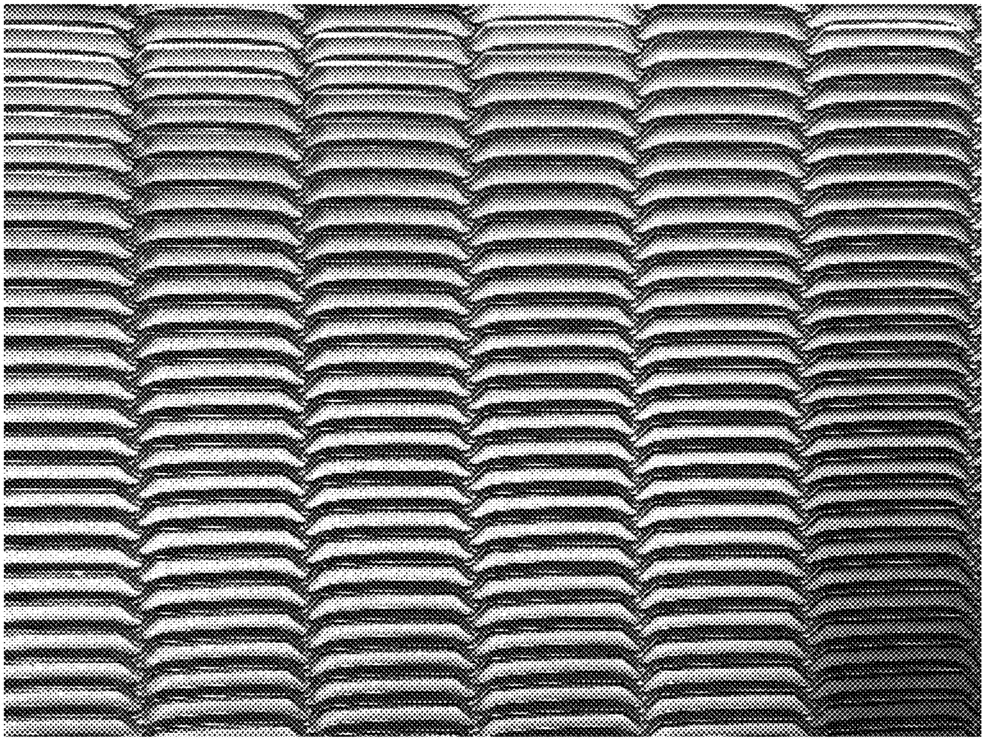
FIG. 9 illustrates a fabric-like expanded metal pattern that simulates long strands of intertwined weaves.
Figure 10:
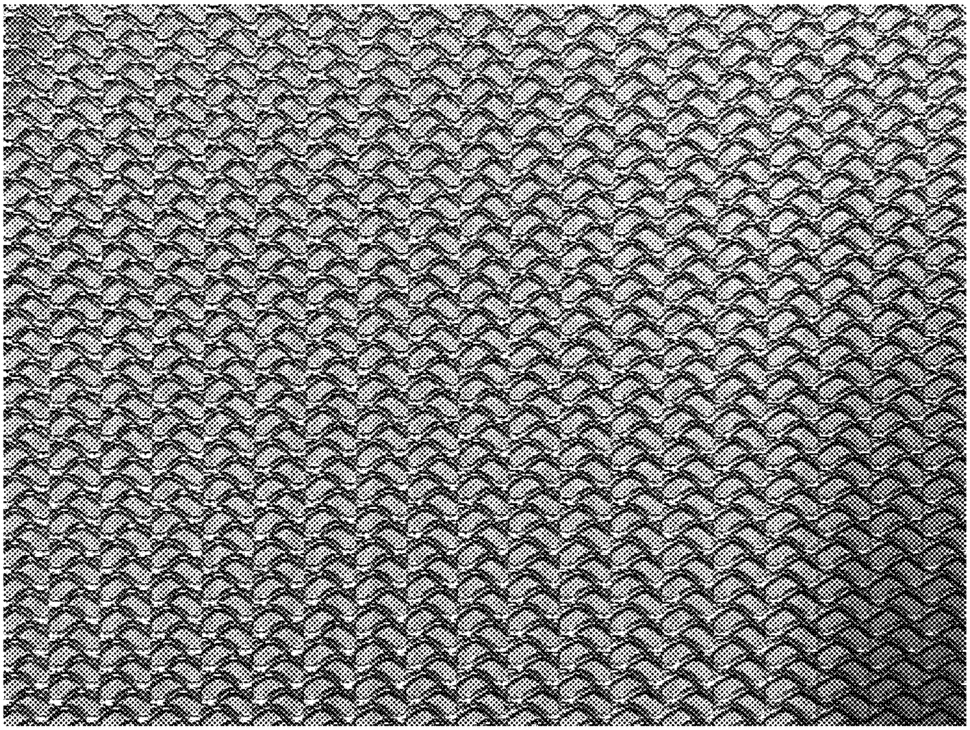
FIG. 10 illustrates a fabric-like expanded metal pattern that simulates a herringbone pattern with differentiation in each row's line direction.
Figure 11:
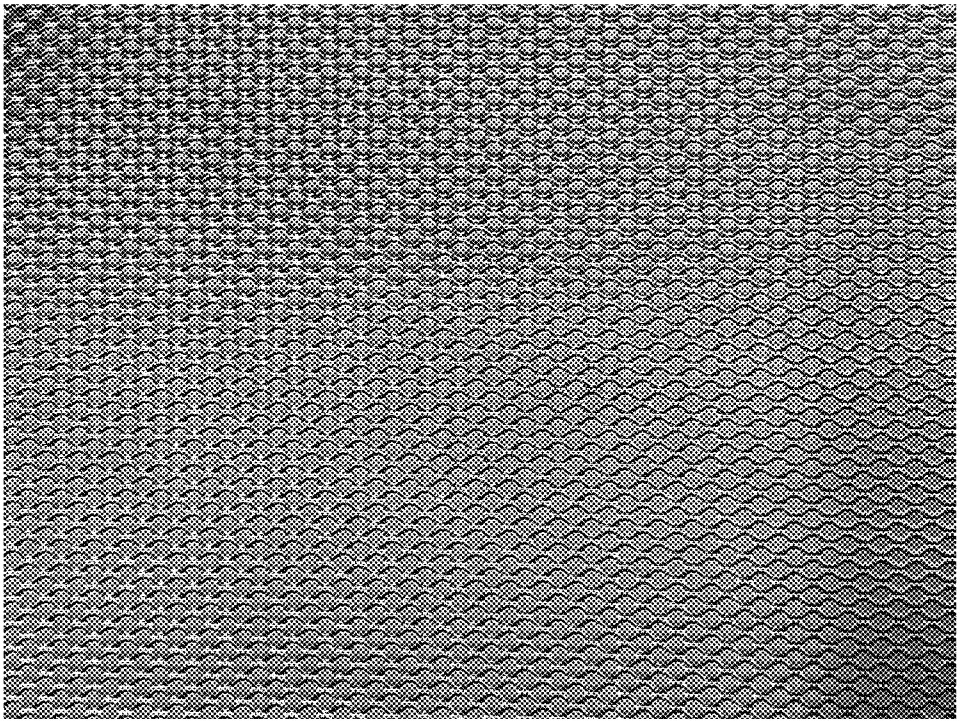
FIG. 11 illustrates a traditional diamond-shaped expanded metal pattern that simulates a symmetrical weave.

FIG. 9 is a fabric-like expanded metal pattern that simulates long strands of intertwined weaves. FIG. 10 is a fabric-like expanded metal configuration that simulates a Herringbone pattern with differentiation in each row's line direction. FIG. 11 shows a traditional diamond expanded metal pattern that simulates a symmetrical weave.

In practice, the OEM may provide master color panels to coordinate color matching and harmony within a given interior trim system. Powder coating formulas are developed to match a base coat color. This color match is prepared to include a specific particle size distribution. As used herein, "particle size distribution" may be defined by a ratio of particle size from the base color to the accent color.

Secondary color formulation follows comparable an initial color-matching process. However, the particle size distribution curve may be changed if desired to enhance a secondary color appearance on a metallic grille surface. A desired result is a metal speaker grille that looks like a cloth or fabric.

Details of representative powder coating process parameters and a powder coating troubleshooting guide can be found at www.tcipowder.com/resources/troubleshooting-guide/chapter-eleven-powder-curing-process, which is incorporated by reference.

The expanded metal may be subjected to one or more pretreatment steps to enhance powder adhesion to the expanded metal substrate. Suitable pretreatment enables lasting corrosion resistance to be achieved. Such pretreatment steps often include cleaning the substrate to remove contaminants and oils, rinsing, and converting the cleaned and rinsed substrate surface. Such conversion may involve chromate conversion for iron phosphate for ferrous metals.

Most conversion coatings include a film that changes the physical and chemical nature of the expanded metal surface. Often the film may exhibit a grey-to-blue iridescence or blue-to-gold iridescence.

Gloss may be measured by shining a known amount of light at a surface and quantifying the reflectance. www.gloss-meters.com/GlossIntro2.html. Most automotive interior fabrics have relatively low gloss levels ranging from 3-9% at a 60-degree viewing angle. In the preferred embodiment, the gloss levels of a finished cloth-like powder-coated expanded metal audio cover that most closely matches the fabric system have a gloss level from 5-7% at a 60-degree viewing angle.

Gloss may be assessed by a "gloss meter," which assigns a gloss unit (GU) to a measured surface. The gloss meter projects an incident light onto the surface at an equal but opposite angle, and the gloss meter measures the amount of reflected light. Gloss units provide a scaling based on a highly polished reference black glass standard with a defined refractive index having a specular reflectance of 100 GU at the specified angle. As used herein, a "low gloss" has a GU of <10.

It will be appreciated that gloss chemistry formulations and final gloss appearance can be adjusted upwardly or downwardly depending on the desired appearance of the finished product or audio cover. Process variables in making, for example, a cloth-like metallic speaker grill include surface texture, the number of powder particle colors, the sizes of the powder particles, the ratio of colors and particle sizes, and the average gloss level.

One goal is to provide an accent harmonizing with a given interior design theme. Desirably, one result is a soft cloth-like appearance created by a multi-colored, speckled appearance that imbues a perceived 2D/3D dimensionality that simulates a fabric. In contrast, conventional approaches produce a coating of a color that does not resemble a cloth-like appearance.

In one approach, metallic audio covers are processed through an electrostatic powder coating system that applies the chemistry developed to match the color and gloss of the target fabric. This powder coat chemistry should be applied at an appropriate film build stage and subsequently cured, preferably using a two-stage curing system in a controlled manner. Such a controlled application and curing system have been found to provide a consistent color, a suitable gloss, a satisfactory appearance, and other performance characteristics. Such characteristics include resistance to various solvents, cleaners, salt spray, abrasion, scratch scuff, anti-microbial properties, mar resistance, and color and apparent texture matching a master sample. If desired, a powder coating process can apply one or more films.

As used herein, the term "anti-microbial" refers to a property or coating which contains an active ingredient that renders it effective against bacterial and fungal growth. Antimicrobial coatings may include solvent, water-based, liquid, or powder coatings. See, e.g., www.microban.com/antimicrobial-solutions/applications/antimicrobial-paints. Suitable formulations can be obtained from such sources as Microban, www.microban.com. The anti-microbial agent may be added to one or more of the pre-treatment film and/or the multi-color powder coating film.

Figure 3A:
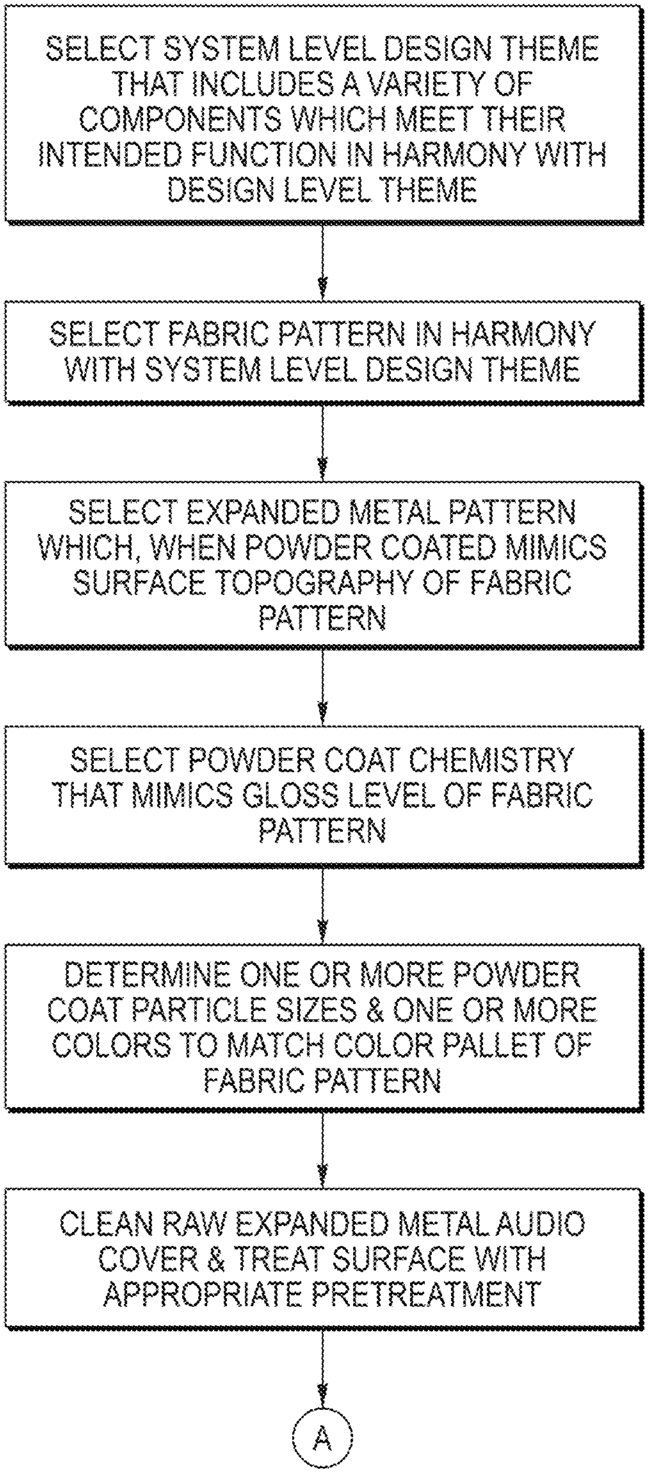
FIGS. 3A and 3B are one representative process flow diagram.
Figure 3B:
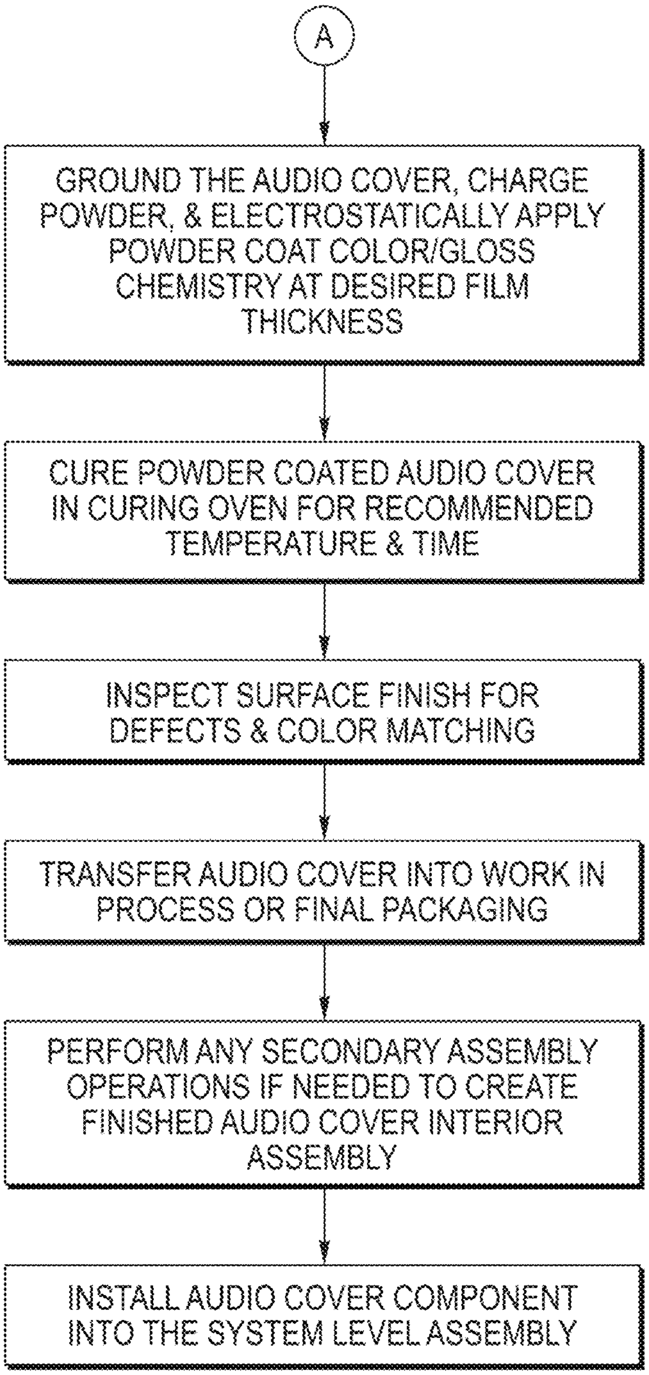
Figure 12:
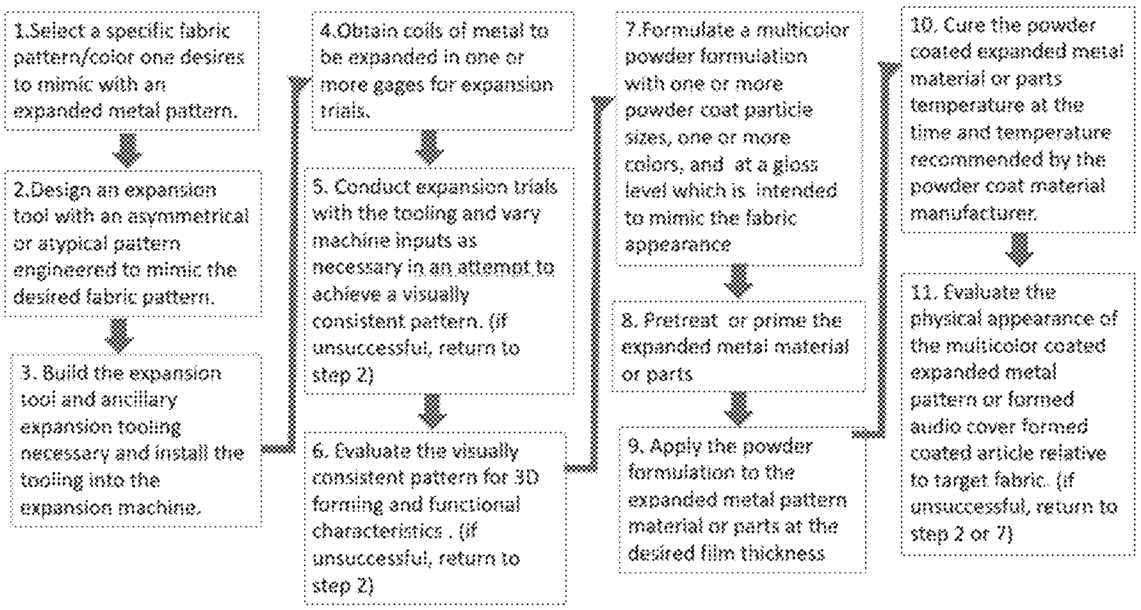
FIG. 12 is a preferred process flow chart that depicts some exemplary method steps that need not be practiced in the sequence shown.

The methods described in FIG. 3A, 3B and 12 take the manufacture of enhanced audio covers to the next level regarding texture and simulation of a cloth-like appearance using alternative coating techniques and chemistries. Such techniques produce audio coverings with cloth-like finishes matching the styling theme.

At least some of the advantages of the process steps disclosed in FIGS. 3A, 3B and 12 include:

Lower cost

Superior durability

No adhesives are required (unlike fabric-covered grilles)

Convex and concave shapes are possible that cannot be embodied in fabric

Fewer components

Reduced system-level complexity.

Testing has shown that a fabric-covered plastic audio cover and the disclosed powder-coated audio cover with a cloth-like appearance are closely related. An ordinary observer cannot readily distinguish one from the other as to surface color, the appearance of the texture and gloss level.

An alternative starting material involves "woven wire". Much like a fabric, woven metal wire can be adapted to be deployed as a raw material upon which a multi-color low gloss powder is applied to achieve a desired fabric look with more "truth" in construction.

Wire can be produced with various diameters and profiles which are subsequently woven into a lattice. But woven wire presents several challenges in adoption/execution. It substantially is more expensive than expanded metal. Once cut, the individual woven wires in the resulting weave may "fray", much like a fabric. During forming, the wires can move relative to one another and distort the weave.

To maintain structural integrity of the formed article, the wires should preferably be welded, brazed, or alternatively adhered to one another.

While the best mode has been described in detail, those familiar with the art will recognize various alternative process steps, designs, and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A metallic audio speaker cover comprising a base of expanded metal with apertures having a unit shape selected from the group consisting of a polygon, an oval, and an ellipse so that openings are created to permit the passage of sound;

a pretreatment film that adheres to the expanded metal base; and a multi-color powder coating film that adheres to the pretreatment film, the multi-color powder coating film having an outer surface with a low gloss that has a cloth-like appearance that emulates a woven or non-woven fabric pattern.

2. The metallic audio speaker cover of claim 1 wherein at least some of the unit shapes of the apertures are configured as a diamond, and the base of expanded metal is characterized by such factors as a SWD (short way of a diamond), a LWD (long way of a diamond), a SWO (short way of an opening) a LWO (long way of an opening), a ST (strand thickness) and a SW (strand width).

3. The metallic audio speaker cover of claim 1 wherein the base of expanded metal includes a material selected from the group consisting of an alloy of low carbon steel, aluminum, an aluminum alloy, stainless steel, and a metallic composite.

4. The metallic audio speaker cover of claim 1 wherein the base of expanded metal includes openings devoid of the pretreatment film and the multi-color powder coating film to permit sound passage through the audio speaker cover.

5. The metallic audio speaker cover of claim 1 further including one or more antimicrobial agents.

6. The metallic audio speaker cover of claim 1 wherein the pretreatment film cleanses the expanded metal base before one or more subsequent coatings and includes a physical layer with an ingredient selected from the group consisting of a primer, zinc phosphate, iron phosphate, a galvanic material, and an electro-coating.

7. A metallic product selected from the group consisting of an audio speaker cover, an air filtration vent cover, a sound absorbing panel cover, and a fluid conduit comprising a base of expanded metal; a pretreatment film that adheres to the expanded metal base; and a multi-color powder coating film that adheres to the pretreatment film, the multi-color powder coating having an outer surface with a low gloss that resembles a fabric or cloth-like material, wherein the multi-color powder coating film includes a coating formula developed to match a base coat color, the coating formula including an initial predetermined particle size distribution.

8. The metallic product of claim 7, wherein the multi-color powder coating film further includes one or more subsequent color formulations, each having a particle size distribution that differs from the initial predetermined particle size distribution to enhance a secondary or subsequent color appearance on a product surface.

9. The metallic product of claim 7, further having an outer surface that faces an observer, the outer surface being characterized by a gloss, texture and color that mimics corresponding properties of an adjacent fabric, the gloss having a gloss level of less than 10 GU.

10. A method of manufacturing a metallic product, the method comprising the steps, not necessarily practiced in the order presented, of:

- providing a base of expanded metal with apertures having a unit shape selected from the group consisting of a polygon, an oval, or an ellipse so that openings are created to permit the passage of sound;
- adhering a pretreatment film to the expanded metal base; and
- powder coating one or more multi-color films that adhere to the pretreatment film, the multi-color films having an outer surface with a low gloss that resembles a fabric or cloth-like material that emulates an adjacent surface to which the speaker cover is attached.

11. The method of claim 10 wherein the step of providing a base of expanded metal includes the step of selecting a diamond unit shape that is characterized by such factors as a SWD (short way of diamond), a LWD (long way of diamond), a SWO (short way of opening) a LWO (long way of opening), a ST (strand thickness) and a SW (strand width).

12. The method of claim 10 wherein the step of providing a base of expanded metal includes providing a metal selected from the group consisting of an alloy of low carbon steel, aluminum, an aluminum alloy, stainless steel, and a metallic composite.

13. The method of claim 10 wherein the step of providing a base of expanded metal includes providing openings that are devoid of pretreatment film and multi-color powder coating film to permit air or gas, or other fluid passage through the metallic product.

14. The method of claim 10 further including the step of providing one or more anti-microbial agents.

15. The method of claim 10 wherein the step of adhering a pretreatment film to the expanded metal base includes the step of cleansing the expanded metal base before applying one or more subsequent coatings, the cleansing step providing a physical layer with an ingredient selected from the group consisting of a primer, zinc phosphate, iron phosphate, a galvanic material, and an electro-coating.

16. The method of claim 10 wherein the powder coating step includes providing a curing agent selected from the group consisting of a polyester, triglycidyl isocyanurate, polyester urethane, and mixtures thereof to produce an outer surface that resembles a target fabric pattern.

17. A method of manufacturing a metallic product, the method comprising the steps, not necessarily practiced in the order presented, of:

- providing a base of expanded metal with polygonal openings therein;
- adhering a pretreatment film to the expanded metal base; and
- powder coating one or more multi-color films that adhere to the pretreatment film, the one or more multi-color powder films having an outer surface with a low gloss that resembles a fabric or cloth-like material that emulates an appearance of a nearby surface to which the metallic product is attached.

18. The method of claim 10 wherein the powder coating step includes utilizing a coating formula that matches a base coat color and selecting an initial predetermined particle size distribution.

19. The method of claim 18 wherein the powder coating step further includes utilizing one or more subsequent color formulations, each having a particle size distribution that differs from the initial predetermined particle size distribution to enhance a secondary or subsequent color appearance on a metallic product surface.

20. The method of claim 18 wherein the powder coating step further includes providing an outer surface that faces an observer, the outer surface being characterized by a gloss, texture, and color that mimics corresponding properties of an adjacent or target fabric pattern.

21. A metallic product selected from the group consisting of an audio speaker cover, an air filtration vent cover, and a fluid conduit comprising

- a base of woven wire;
- a pretreatment film that adheres to the woven wire base; and
- a multi-color powder coating film that adheres to the pretreatment film, the multi-color powder coating having an outer surface that has a low gloss that resembles a fabric or cloth-like material, and a coating formula developed to match a base coat color, the coating formula including an initial predetermined particle size distribution so that the cloth-like appearance of the metallic product resembles a target fabric pattern.

* * * * *